Jan. 6, 1953   P. GIUFFRIDA   2,624,813
GATE SWITCH
Original Filed Nov. 1, 1946

Inventor
PHILIP GIUFFRIDA
By M C Metcalf
Attorney

Patented Jan. 6, 1953

2,624,813

UNITED STATES PATENT OFFICE 2,624,813

GATE SWITCH

Philip Giuffrida, Lawrence, Mass., assignor to Photoswitch Incorporated, Cambridge, Mass., a corporation of Massachusetts Original application November 1, 1946, Serial No. 707,107. Divided and this application September 11, 1950, Serial No. 184,149

9 Claims. (Cl. 200—52)

This invention relates to the detection of film breakage in motion picture projectors, this being a division of the inventor's co-pending application, Serial No. 707,107, filed Nov. 1, 1946, now Patent No. 2,566,187, dated August 28, 1951.

The type of film now in use for commercial motion picture projection is highly inflammable and in burning gives off gases which may, under certain conditions, becomes explosive. The film must be projected by a powerful and concentrated light for satisfactory reproduction on a screen of the average theatre size. When the projector is in normal operation, the film moves past the illuminating aperture so rapidly that no damage is done by the intense heat which the light source emits. If a jam or break occurs, however, the film remaining in the gate will catch fire unless the light from the projection lamp is immediately cut off. Commercial projectors are provided with a fire shutter which the operator can swing into place between the projection light and the film upon film breakage, but constant vigilance on the part of the operator is required if the shutter is to be operated and the projector shut off quickly enough to prevent fire. The devices heretofore proposed for automatic film break detection have generally been rejected by professional motion picture operators because such devices have employed separate switches which increase the number of operations required to thread the film, so that the inconvenience and loss of time occasioned far outweighs the gain in safety.

The object of this invention is to provide a switch for operating suitable electrical safety controls upon film breakage which is positive and reliable in its action, which does not in any way affect the normal operation of the projector, which permits threading of the film in the usual way without additional operations, and which can be readily applied to most of the projectors now in use with only minor modifications to the existing structure.

The invention consists in general of a modification to the gate structure of a projector so that an electrical contact is established in the absence of film, the contact being broken when film is threaded through the gate in the usual way.

Figure 1:
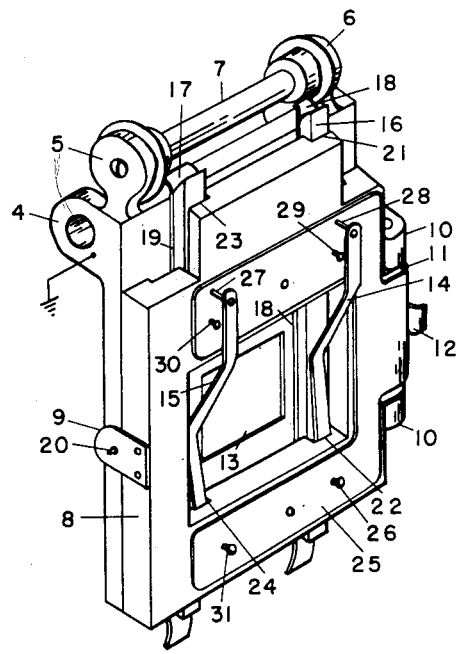
Fig. 1 is a perspective view of the switch.

The switch, as illustrated in Fig. 1, is intended to replace the standard film gate in a projector. The metal body 4 is electrically grounded and carries a pair of brackets 5 and 6 which support a film spool 7. The body is provided with a film aperture 13 to permit passage of the light beam from the projection lamp (not shown). Two metal strips 17 and 18 are mounted on the body 4, in good electrical contact, along the edges of the path of the film (not shown). The movable frame 8 of the film gate is made of insulating material, and has a hinge bracket 11 which is pivoted on hinge brackets 10 projecting from body 4. When the projector is operating, the gate is closed and tab 9, which is attached to frame 8, engages spring catch 20 on the body. Two electrically conductive bars 16 and 19 are mounted on frame 8 in recesses 21, 22, and 23, 24 respectively, and are arranged to make electrical contact with strips 17 and 18 in the absence of film. A pair of conductive leaf springs 14 and 15, which are attached to frame 8 by mounting pins 28 and 27, respectively, in electrical contact with metal plate 25, forms contacts with bars 16 and 19, and holds the bars in resilient engagement with strips 17 and 18. Plate 25 is attached to frame 8 by mounting screws 26, 29, 30 and 31 and engages spring contact 12 to which electrical connections may be made.

In normal operation, the movie film travels over the spool 7 between the body 4 and the frame 8 as in any standard projector. The switch bars 16 and 19 ride on the border of the film and are held from contact with strips 17 and 18 by the film. If the film breaks and runs out of the gate, the switch bars 16 and 19 engage strips 17 and 18 and establish an electrical connection from contact 12 to ground.

Figure 2:
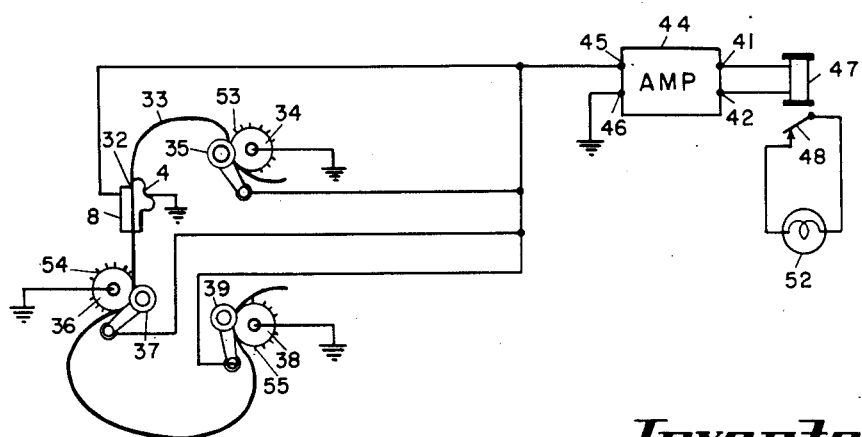
Fig. 2 illustrates a circuit for a safety control installation employing the switch.

Fig. 2 illustrates how the switch may be used as a safety control on a projector. The switch is connected in the input circuit of an electronic amplifier 44 having input terminals 45 and 46. Terminal 46 is grounded and frame 8 is connected to terminal 45. The film 33 is threaded through the modified gate 32 and through sprocket and roller drives 53, 54, and 55 of the projector in the usual manner. Any or all sprocket and roller sets may be modified to act as a film break detection switch as shown in the inventor's co-pending application, Serial No. 707,107, filed Nov. 1, 1946. In this case, one side of each switching device is grounded and the other connected to terminal 45. The electronic amplifier 44 has output terminals 41, 42 and may be of any conventional type in which current flows in the output circuit in response to completion of the input circuit. A relay 47 is connected to output terminals 41 and 42, and may control any suitable safety device. The relay is here illustrated as controlling a normally closed contact 48 connected in the energizing circuit for lamp 52. With this arrangement, upon film breakage, when the circuit to input terminal 45 is completed, through the gate switch 32, or through any of the sprocket switches connected in parallel with it, current flows through relay 47, the relay becomes energized opening contact 48 and turning off the projection lamp 52. The relay may operate other contacts, for example, to control a dowser or to shut down the projector motor.

Since many changes not herein specifically referred to may be made in the above-described article and different embodiments of the invention could be made without departing from the scope thereof, it is intended that all matter contained in the above description or shown in the accompanying drawing shall be interpreted as illustrative only and not in a limiting sense.

What is claimed is:

1. A switch for film break detection in motion picture projectors comprising: a pair of apertured frames hinged together and adapted to operate as the gate of the projector; a pair of contacts, one mounted on each of said frames, arranged to engage between them a border of a film passing through the gate; and spring means for pressing said contacts into engagement in the absence of film in the gate.

2. A switch according to claim 1 having a second pair of contacts, one mounted on each of said frames, adapted to engage between them the other border of the film, and a second spring means for pressing said second pair of contacts into engagement in the absence of film.

3. A switch according to claim 1, having mounted on one of said frames a terminal to which electrical connections may be made, said spring means providing a conductive path from said contacts to said terminal.

4. A switch for film break detection in motion picture projectors comprising: a pair of apertured frames hinged together and adapted to operate as the gate of the projector, one of said frames being electrically conductive, and the other being made of insulating material; a conductive member mounted on said insulating frame, disposed so as to engage the border of a film passing through the gate; and spring means for pressing said member into electrical contact with said conductive frame in the absence of film in the gate.

5. A switch according to claim 4 having a conductive plate mounted on said insulating frame, and a terminal mounted on said insulating frame in resilient contact with said plate, said spring means providing a conductive path between said plate and said conductive member.

6. A switch for film break detection in motion picture projectors comprising: a pair of apertured frames hinged together and adapted to operate as the gate of the projector; one of said frames being made of insulating material; a pair of conductive bars mounted on said insulating frame in such a position as to engage the border of film passing through the gate; a pair of conductive strips mounted on the other frame, opposite said bars; and spring means for pressing said bars into engagement with said strips in the absence of film in the gate.

7. A switch according to claim 6 having a conductive plate mounted on said insulating frame, and said spring means comprising a pair of conductive leaves mounted in electrical contact with said plate and said bars.

8. A switch according to claim 6, said insulating frame having grooves in which said bars are mounted.

9. A switch according to claim 6, said bars and strips being mounted in a direction parallel to the direction of travel of the films and being curved outward at their ends.

PHILIP GIUFFRIDA.

REFERENCES CITED

The following references are of record in the file of this patent:

UNITED STATES PATENTS

| Number | Name | Date |
|---|---|---|
| 1,388,515 | Clark | Aug. 23, 1921 |
| 1,577,208 | Eeles | Mar. 16, 1926 |